United States Patent
Haque et al.

(10) Patent No.: US 9,024,817 B2
(45) Date of Patent: May 5, 2015

(54) SYSTEMS AND METHODS FOR RECEIVING AIRCRAFT POSITION REPORTS

(75) Inventors: Jamal Haque, Clearwater, FL (US);
Halil N. Altan, Heathrow, FL (US);
Alfonso Malaga, Sammamish, WA (US);
Darryl I. Parmet, Tampa, FL (US);
Daniel R. Tabor, Belleair Beach, FL (US)

(73) Assignee: Honeywell International Inc., Morristown, NJ (US)

( * ) Notice: Subject to any disclaimer, the term of this patent is extended or adjusted under 35 U.S.C. 154(b) by 583 days.

(21) Appl. No.: 13/316,052

(22) Filed: Dec. 9, 2011

(65) Prior Publication Data
US 2013/0147652 A1  Jun. 13, 2013

(51) Int. Cl.
H04B 7/185 (2006.01)
G01S 3/02 (2006.01)
G08G 5/00 (2006.01)
G01S 5/00 (2006.01)

(52) U.S. Cl.
CPC ............ G08G 5/0082 (2013.01); G08G 5/0008 (2013.01); G01S 5/0027 (2013.01); G01S 2205/003 (2013.01); G08G 5/0013 (2013.01); G08G 5/0078 (2013.01)

(58) Field of Classification Search
CPC . G01S 13/9303; G08G 5/0078; H04B 7/2041
USPC ............. 342/29, 36, 354, 454, 465; 455/12.1; 701/301, 469
See application file for complete search history.

(56) References Cited

U.S. PATENT DOCUMENTS

| | | | |
|---|---|---|---|
| 5,557,285 A | 9/1996 | Bender | |
| 6,202,317 B1 | 3/2001 | Mueggenberg | |
| 6,943,745 B2 | 9/2005 | Rao | |
| 7,570,214 B2 | 8/2009 | Smith | |
| 7,777,675 B2 | 8/2010 | Smith | |
| 8,862,122 B2 | 10/2014 | Barthere et al. | |
| 2002/0067311 A1 | 6/2002 | Wildey | |
| 2002/0138200 A1 | 9/2002 | Gutierrez | |
| 2006/0071876 A1 | 4/2006 | Clymer | |
| 2011/0160941 A1 | 6/2011 | Garrec | |

OTHER PUBLICATIONS

Gupta, "Global Augmentation of ADS-B Using Iridium Next Hosted Payloads", "Iridium Everywhere; Retrieved from http://www.aiaa.org/pdf/industry/presentations/Om_Gupta.pdf", Feb. 9, 2011, pp. 1-14, Publisher: Iridium Communications Inc.
Tham, "Robust Antenna Pointing Control for TDRS Spacecraft ", "Proceedings of the 36th IEEE Conference on Decision and Control, 1997", Dec. 10, 1997, pp. 4938-4942 , vol. 5.
European Patent Office , "Communication Under Rule 71(3)", "from Foreign Counterpart of U.S. Appl. No. 13/316,052", Nov. 15, 2013, pp. 1-45, Published in: EP.
European Patent Office, "European Search Report", "from Foreign Counterpart of U.S. Appl. No. 13/316,052", Apr. 11, 2013, pp. 1-3, Published in: EP.

*Primary Examiner* — Dao Phan
(74) *Attorney, Agent, or Firm* — Fogg & Powers LLC

(57) ABSTRACT

One embodiment is directed to an aircraft position report system. The system comprises a satellite, an aircraft position reporting receiver mounted on the satellite, an antenna element mounted on the satellite, and an antenna interface mounted on the satellite. The aircraft position reporting receiver receives aircraft position reports through the antenna element by associating a spot beam with a narrow coverage area. The aircraft position reports are derived from a signal produced by the antenna element. The antenna interface changes the narrow coverage area associated with the spot beam to receive aircraft position reports from a wide coverage region within a reporting period. In one exemplary embodiment, the antenna interface mechanically steers the spot beam for each receiver to one of the narrow coverage areas. In another exemplary embodiment, the antenna interface electronically steers the spot beam for each receiver to one of the narrow coverage areas.

35 Claims, 8 Drawing Sheets

SYSTEMS AND METHODS FOR RECEIVING AIRCRAFT POSITION REPORTS

BACKGROUND

The Automatic Dependent Surveillance-Broadcast (ADS-B) services and protocols are used for tracking the position, heading, and speed of aircraft. In upcoming years, the United States will require that a majority of aircraft operating within its airspace be equipped with some form of an ADS-B transmitter. Currently, aircraft use antennas on the top and bottom of the aircraft to communicate with other aircraft and ground networks to share their location, speed, and heading. These current communications are generally aircraft-to-aircraft and aircraft-to-ground communications. However, the aircraft-to-ground communications are subject to multiple limitations. For example, common ground equipment can interfere with transmitted signals, mountains and tall buildings can obstruct signals from low altitude aircraft, the range of ground terminals does not extend to oceanic flights, and the density of ground terminals may affect coverage. Further, coverage provided by ground equipment is proportional to the density of ground terminals.

To assist the limitations of aircraft-to-ground communications and provide oceanic coverage, others have proposed installing ADS-B receivers on satellites. For example, IRIDIUM has sent a request for information regarding augmenting its low earth orbit satellites with ADS-B receivers to extend the terrestrial ADS-B infrastructure to provide continuous global coverage. However, current aircraft have pre-installed low gain antennas and transmitter systems with a fixed transmission power. The low gain and low transmission power inhibit the communication of aircraft position reports over the large distance separating aircraft and satellites.

SUMMARY

One embodiment is directed to an aircraft position report system. The system comprises a satellite, an aircraft position reporting receiver mounted on the satellite, an antenna element mounted on the satellite, and an antenna interface mounted on the satellite. The aircraft position reporting receiver receives aircraft position reports through the antenna element by associating a spot beam with a narrow coverage area. The aircraft position reports are derived from a signal produced by the antenna element. The antenna interface changes the narrow coverage area associated with the spot beam to receive aircraft position reports from a wide coverage region within a reporting period.

In one exemplary embodiment, the antenna interface mechanically steers the spot beam for each receiver to one of the narrow coverage areas. In another exemplary embodiment, the antenna interface electronically steers the spot beam for each receiver to one of the narrow coverage areas.

DRAWINGS

In accordance with common practice, the various described features are not drawn to scale but are drawn to emphasize specific features relevant to the exemplary embodiments.

DETAILED DESCRIPTION

Figure 1:
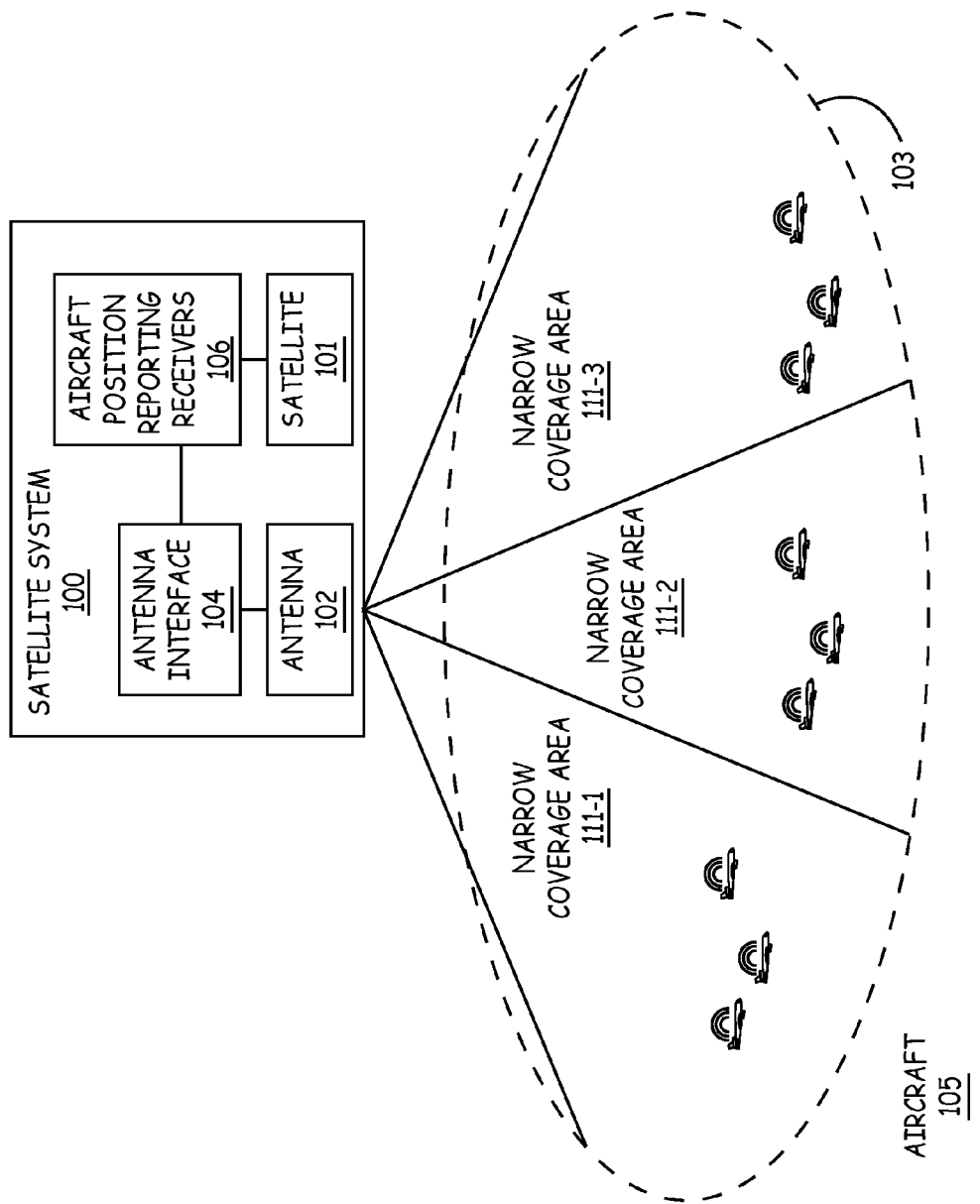
FIG. 1 is a block diagram of one exemplary high-level embodiment of a satellite system that is configured to receive aircraft position reports.

FIG. 1 is a block diagram of one exemplary high-level embodiment of a satellite system 100 that receives aircraft position reports broadcasted from a plurality of aircraft 105. The exemplary embodiment of system 100 is described here in connection with FIG. 1 as being implemented for use with the ADS-B service and protocols and with and in a low-earth orbit satellite 101 such as an IRIDIUM satellite, though it is to be understood that other embodiments can be implemented in other ways. For example, the system 100 can be implemented for use with other aircraft position report message transmissions systems and protocols.

Satellite system 100 receives the aircraft position reports and relays the reports to ground terminals and other aircraft (not shown). The information in the aircraft position reports can be used to help determine the position and heading of aircraft 105. By knowing the position and heading of aircraft 105, air traffic controllers and other aircraft can coordinate the movement of aircraft 105 and the other aircraft to ensure safe air travel.

To guarantee that the communicated position and heading of the individual aircraft 105 are up-to-date, the aircraft 105 periodically broadcast short messages containing their position and heading information. In this particular exemplary embodiment, which is implemented for use with the ADS-B services and protocols, the aircraft 105 broadcast a 112-bit message approximately every second. The broadcasted message then is received by other aircraft, ground terminals, and by satellites such as satellite 101.

The exemplary embodiment shown in FIG. 1 is described here as being implemented for use with typical ADS-B aircraft configurations. Typically in such configurations, when aircraft 105 broadcast their position and heading, the aircraft 105 broadcast through two different antennas, where one antenna is positioned on the bottom of the aircraft 105 and the other antenna is positioned on the top of the aircraft 105. Further, the aircraft 105 typically broadcast ADS-B messages with a low transmission power. For example, the aircraft 105 broadcast aircraft position reports with 45 W to greater than 200 W of power with an antenna gain of +3 dBi to −3 dBi towards space. Because the transmission antennas on aircraft 105 have low gain and the messages are broadcast with low transmission power in relation to the distance between the aircraft 105 and satellite system 100, the satellite system 100 includes an antenna 102 and an antenna interface circuit 104 (also referred to here simply as "antenna interface" 104) mounted on satellite 101 capable of producing one or more signals or other inputs that are provided to one or more aircraft position reporting receivers 106 included in the satellite system 100. Each receiver 106 uses such signals or other inputs to extract aircraft position reports in accordance with the ADS-B (or other aircraft position report system) protocols.

As noted above, the exemplary embodiment shown in FIG. 1 is described here as being implemented with a low-earth orbit satellite 101. In other embodiments, other types of satellites are used such as satellites in a geostationary orbit, a middle earth orbit, or a high earth orbit.

As shown in FIG. 1, satellite 101 has a footprint that covers a wide coverage region 103 of the earth. The phrase "wide coverage region," as used herein, refers to a region from which the satellite system 100 has the responsibility of receiving aircraft position reports. For example, IRIDIUM has created a constellation of 66 low earth orbit satellites where each satellite is responsible for, and capable of, receiving signals from one of 66 wide coverage regions. The constellation of 66 satellites, with their associated wide coverage regions, provides global coverage.

The satellite 101 used in system 100 typically performs multiple functions, and the equipment used to perform the multiple functions limits the available space for a system that receives aircraft position reports. The limited space on satellite 101 typically prevents the mounting of a large antenna that has low directivity but sufficient gain to accurately receive broadcasted aircraft position reports from aircraft 105 in wide coverage region 103 at the same time. Thus, satellite system 100 includes a smaller antenna 102 that has a narrower associated coverage area but with high directivity. In one example implementation, the antenna 102 receives broadcasted aircraft position reports with 12 dBi to 25 dBi gain and produces a spot beam width of 16 degrees to 30 degrees. From a low-earth orbit, a beam width of 16 degrees to 30 degrees can cover an area on the earth with a diameter of 220 km to 450 km. The high directivity of antenna 102 enables satellite system 100 to accurately receive aircraft position report transmissions that are broadcast with low power.

However, the narrow coverage area that can be produced using such an antenna 102 is typically unable to cover the entirety of wide coverage region 103 at one time. Thus, the wide coverage region 103 is divided into multiple smaller narrow coverage areas 111. In the particular example shown in FIG. 1, the wide coverage region 103 is divided into three narrow coverage areas 111 for ease of explanation, though it is to be understood that any number of narrow coverage areas 111 can be used. Also, the three narrow coverage areas 111 are individually referenced here using the reference numerals 111-1, 111-2, and 111-3, respectively.

Figure 2:
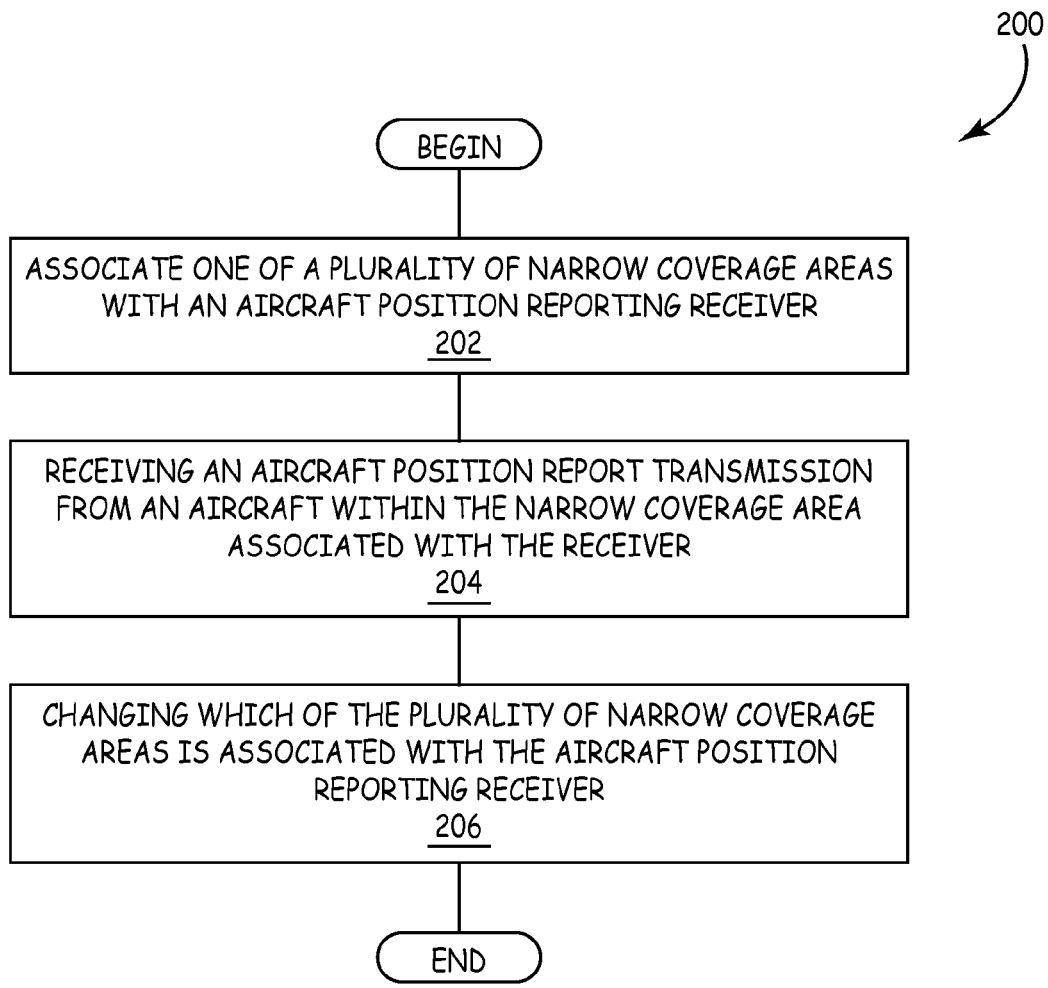
FIG. 2 is a flow diagram of one exemplary embodiment of a method of receiving aircraft position report transmissions from aircraft within a wide coverage region using a satellite.

FIG. 2 is a flow diagram of one exemplary embodiment of a method 200 of receiving aircraft position report transmissions from aircraft 105 within a wide coverage region 103 using a satellite 101. The embodiment of method 200 shown in FIG. 2 is described here as being implemented in the satellite system 100 of FIG. 1 though other embodiments can be implemented in other ways.

Method 200 comprises associating one of a plurality of narrow coverage areas 111 with each aircraft position reporting receiver 106 in the system 100 (block 202). This is done in connection with producing one or more signals or other inputs for that receiver 106 from one or more signals output from one or more antenna elements included in the antenna 102 that is mounted on the satellite 101. The one or more signals or other inputs that are produced for each receiver 106 are also referred to here collectively as the "input" for that receiver 106.

Method 200 further comprises receiving, at each receiver 106 using the respective input produced for that receiver 106, aircraft position report transmissions from any aircraft 105 within the narrow coverage area 111 associated with that receiver 106 (block 204). The receiver 106 receives such transmissions in accordance with the ADS-B (or other aircraft position reporting) protocols in order to extract the aircraft position reports from the transmissions. These aircraft position reports can then be used locally at the satellite and/or relayed to other nodes (for example, ground control or other aircraft) using the conventional satellite communication capabilities otherwise provided by the satellite 101.

In the exemplary embodiment described here in connection with FIG. 2, the antenna interface 104 is configured to produce the input for each receiver 106 from the one or more signals output from one or more antenna elements of the antenna 102 and, in connection therewith, to associate one of the narrow coverage areas 111 with each receiver 106 in the system 100.

The input for each receiver 106 is also referred to here as a "spot beam", which has an associated narrow coverage area 111. The antenna interface 104 is configured to selectively steer the spot beam for each receiver 106 to one of the narrow coverage areas 111 by changing the manner in which the input for each receiver 106 is produced. In one embodiment (described below in connection with FIGS. 3 and 4), the antenna interface 104 mechanically steers the spot beam for each receiver 106 to one of the narrow coverage areas 111. In another embodiment (described below in connection with FIGS. 5 and 6), the antenna interface 104 electronically steers the spot beam for each receiver 106 to one of the narrow coverage areas 111.

Each receiver 106 receives any aircraft position report transmissions from aircraft 105 located in the narrow coverage area 111 to which that receiver's spot beam has been steered.

Method 200 further comprises changing which of the plurality of narrow coverage areas 111 is associated with each aircraft position reporting receiver 106 (block 206). The period in which a narrow coverage area 111 is associated with a particular receiver 106 (that is, the period in which the spot beam for a particular receiver 106 is steered to a particular narrow coverage area 111) is also referred to here as the "dwell time period."

Typically, each aircraft position report protocol (such as ADS-B) will specify a reporting period during which a position report for each aircraft 105 within a given (wide) coverage area 103 must be received. This period is also referred to here as the "reporting period." For example, the reporting period in some ADS-B systems is 30 seconds.

As noted above, in the exemplary embodiment described here in connection with FIGS. 1 and 2, the antenna 102 has a narrow coverage area 111 but high directivity. In order for such an antenna 102 to be used to receive aircraft position report transmissions throughout a wide coverage region 103 (that is, a coverage area that is wider than the narrow coverage area 111 that can be provided by using the antenna 102), the spot beam produced for each receiver 106 is steered to different ones of the narrow coverage areas 111 so that at least one spot beam is steered to each of the narrow coverage areas 111 at least once during each reporting period. In this way, aircraft 105 in each of the narrow coverage areas 111 will have an opportunity to have their aircraft position report transmissions received by a receiver 106 in the satellite system 100 during each reporting period.

The respective dwell time periods are assigned to the various narrow coverage areas 111 in order to achieve a sufficiently high probability that aircraft position report transmissions can be received from all aircraft 105 located within the wide coverage region 103 during each reporting period. For example, in accordance with the ADS-B protocol, aircraft 105 broadcast an aircraft position report each second. While signals from different aircraft 105 in the same narrow coverage area 111 may reach satellite system 100 at the same time and interfere with one another, it is highly improbable that two consecutive transmissions from the same aircraft 105 would interfere with one another. Thus, as the dwell time increases, so does the probability that an aircraft position report will be successfully received from each aircraft 105 in each narrow coverage area 111. For example, a dwell time period of five seconds will typically allow an aircraft position report to be received from every aircraft 105 in a narrow coverage area 111.

In some applications, it is appropriate to configure the system 100 so that the dwell time periods assigned to the narrow coverage areas 111 are all the same. For example, where the reporting period is thirty seconds and there are three narrow coverage areas 111 and one receiver 106 in the system 100, the dwell time period assigned to each narrow coverage area 111 can be ten seconds. Thus, in such an application, antenna interface 104 would be configured to change the narrow coverage area 111 associated with the receiver 106 once every ten seconds. For example, in such an application, the antenna interface 104 steers the spot beam for the receiver 106 to first narrow coverage area 111-1 for the first ten seconds in a given reporting period. The antenna interface 104 then steers the spot beam for the receiver 106 to the second narrow coverage area 111-2 for the second ten seconds in that reporting period. The antenna interface 104 then steers the spot beam for the receiver 106 to the third narrow coverage area 111-3 for the remaining time in that reporting period.

In other applications, it is appropriate to assign dwell time periods to some narrow coverage areas 111 that are longer than the dwell time periods assigned to other narrow coverage areas 111. For example, where first coverage area 111-1 generally contains more aircraft 105 than third coverage area 111-3, the dwell time period assigned to the first narrow coverage area 111-1 can be longer than the dwell time period assigned to the third narrow coverage area 111-3.

Also, in some applications, it may be appropriate that the dwell time periods assigned to the narrow coverage areas 111 are static, whereas in other applications the dwell time periods assigned to the narrow coverage areas 111 are dynamic. Moreover, in some applications, the dwell time periods are assigned to the various narrow coverage areas 111 based on the expected or actual number of aircraft 105 that are located in each of the narrow coverage areas 111. For example, the satellite system 100 can be configured to receive information about the expected or actual number of aircraft 105 that are located in each of the narrow coverage areas 111 from, for example, ground traffic control or other sources. The expected number of aircraft 105 within each narrow coverage area 111 can be determined based on traffic routes or schedules or historical aircraft position reports. For example, an aircraft 105 travelling through the coverage region 103 is in first narrow coverage area 111-1 during a first pass through the wide coverage region 103. Based on the position of the aircraft 105, during the next pass through the wide coverage region 103, an external system (such as ground control) instructs satellite system 100 that the aircraft 105 is in (or will soon be in) the second narrow coverage area 111-2 and, in response to this information, the dwell time periods assigned to the various narrow coverage areas 111 can be adjusted. Such adjustments to the dwell time periods can be initiated by the satellite system 100 itself (for example, by providing information about the expected or actual number of aircraft 105 within each narrow coverage area 111 to the satellite system 100 and then having it determine if any adjustments need be made); alternatively, an external system can instruct the satellite system 100 to adjust the dwell time period assigned to each narrow coverage area 111 (for example, where ground control provide such instructions to the satellite system 100).

As noted above, FIG. 3 is a diagram illustrating the mechanical steering of a spot beam through different narrow coverage areas 311. In one exemplary embodiment, the antenna interface 104 associates the spot beam with different narrow coverage areas 311 by steering the spot beam through multiple narrow coverage areas 311 in a wide coverage region 303 using a gimbal 308. When antenna interface 104 uses gimbal 308 to steer the spot beam through narrow coverage areas 311, antenna interface 104 physically changes the position of the antenna 102 using gimbal 308 so that antenna 102 points toward the different narrow coverage areas 311. In this particular exemplary embodiment, a wide coverage region 303 is divided into narrow coverage areas 311, such as first narrow coverage area 311-1, second narrow coverage area 311-2, and third narrow coverage area 311-3. To receive aircraft position reports from all the aircraft 305 in the wide coverage region 303, the gimbal 308 controls the antenna 102 on the satellite such that the spot beam of the antenna 102 points to narrow coverage area 311-1 for a first dwell time period. After the first dwell time period expires, the gimbal 308 mechanically adjusts the position of the antenna 102 so that the antenna 102 points to narrow coverage area 311-2 for a second dwell time period. To receive aircraft position report transmissions from the aircraft 305 within a wide coverage region 303, gimbal 308 steers the antenna 102 so that the spot beam is pointed at each narrow coverage area 311 in wide coverage region 303 for a dwell time period during a reporting period.

Figure 3:
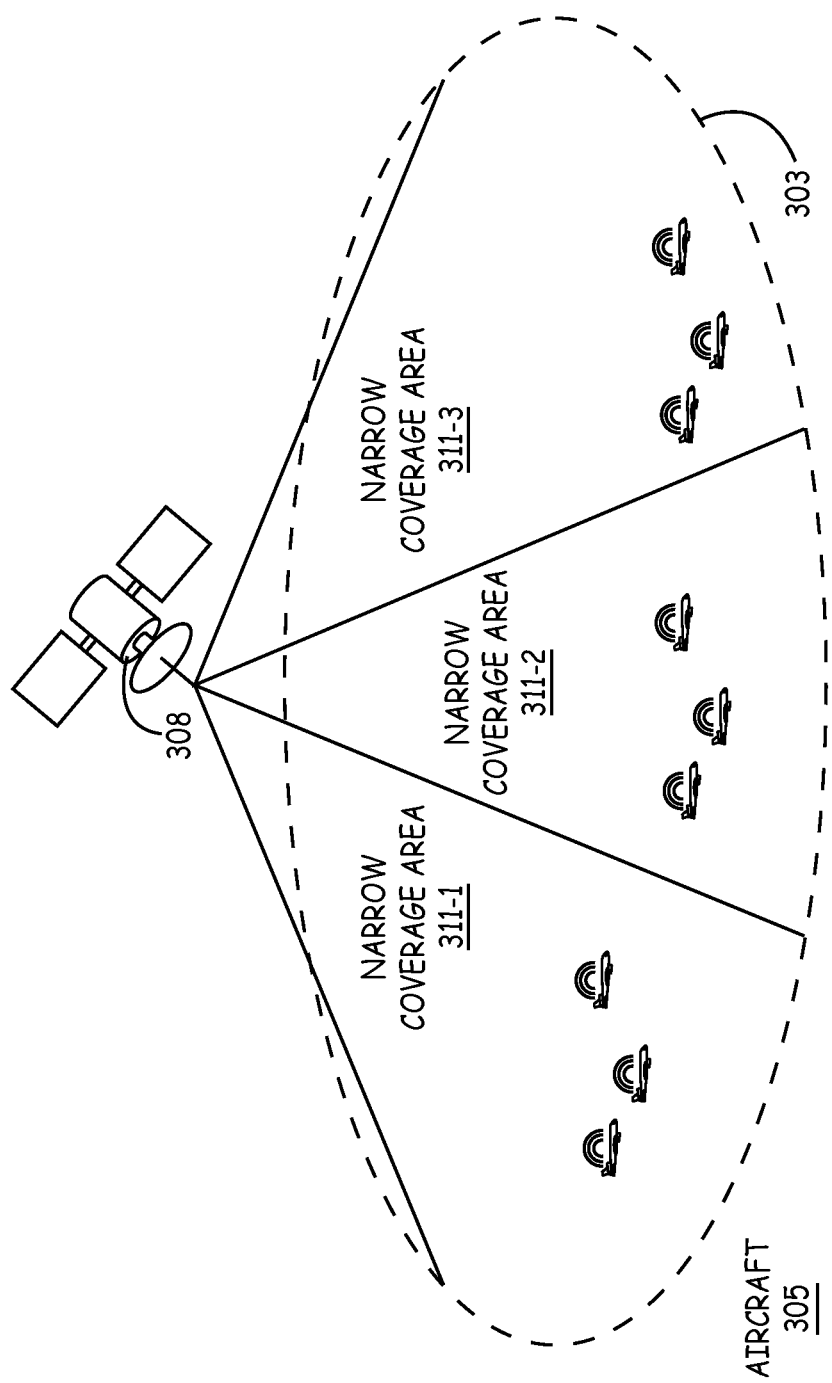
FIG. 3 is a diagram illustrating one exemplary embodiment of the satellite system shown in FIG. 1.
Figure 4:
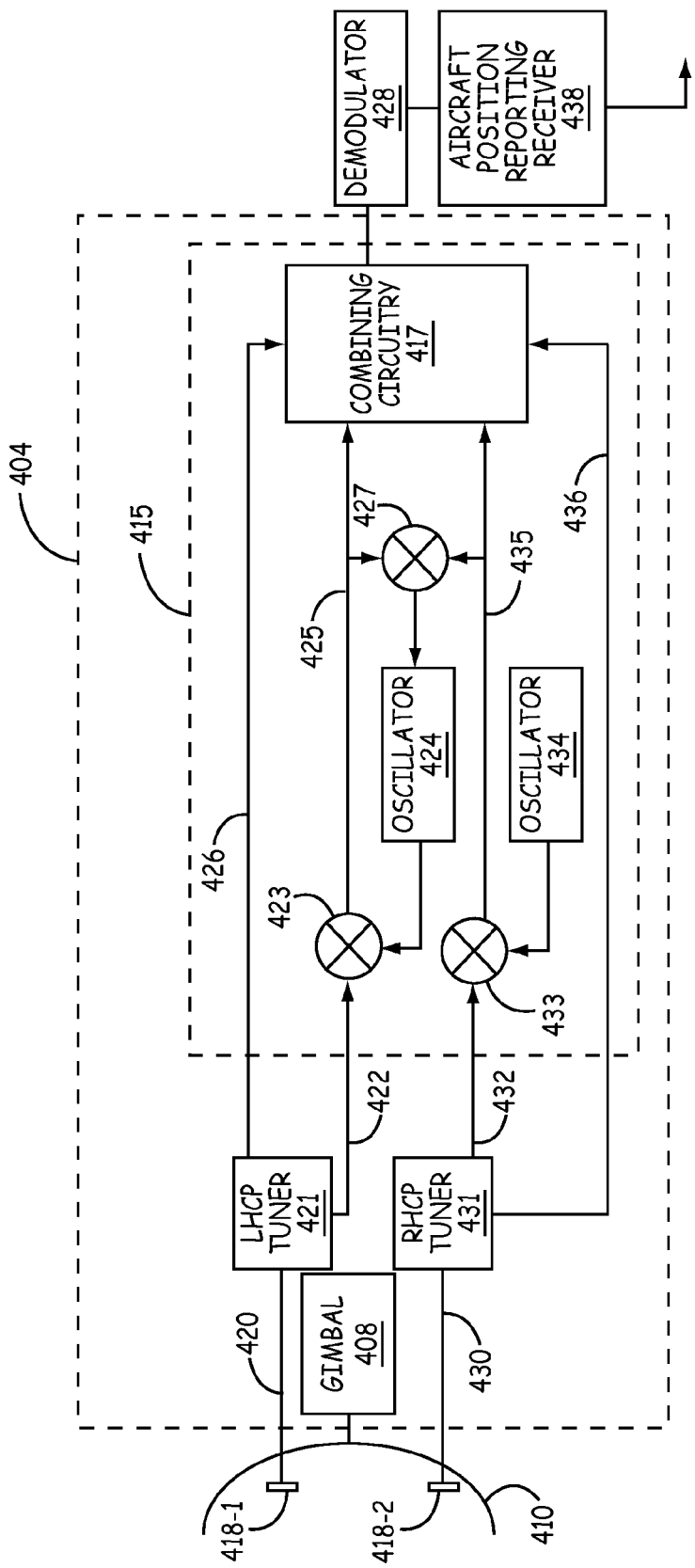
FIG. 4 is a schematic diagram of one exemplary embodiment of an antenna interface suitable for use in the embodiment of a satellite system shown in FIG. 3.

FIG. 4 is a schematic diagram of one exemplary embodiment of an antenna interface 404 for receiving aircraft position report transmissions through a mechanically steered receiving antenna 402. As explained above in relation to FIG. 3, the antenna interface 404 mechanically steers a spot beam by mechanically changing the position of the antenna 402. In one exemplary implementation, antenna interface 404 uses a gimbal 408 to change the position of the antenna 402.

To facilitate the reception of aircraft position report transmissions, antenna interface 404, antenna 402 includes multiple elements configured to respond to different characteristics of a transmitted signal. In this particular exemplary embodiment, the multiple antenna elements include a left hand circularly polarized (LHCP) element 418-1 to respond to LHCP signals and a right hand circularly polarized (RHCP) element 418-2 to respond to RHCP signals. In certain situations, aircraft 305 broadcast aircraft transmission reports using a linearly polarized signal. Due to the attitude, position, and heading of aircraft 305, the orientation of the linearly polarized signal is unknown when the signal reaches antenna 402. To receive the signal, LHCP element 418-1 responds to a LHCP component of the linearly polarized signal and RHCP element 418-2 responds to a RHCP component of the linearly polarized signal. Antenna interface 404 combines the RHCP and LHCP components to recreate the linearly polarized signal. In this particular exemplary embodiment, aircraft 305 could be rolling, pitching, or yawing at the time of the aircraft position report transmission, changing the angle of linear polarization for the transmitted signal. When the transmitted signal reaches antenna 402, the LHCP element 418-1 respond to the LHCP component of the linearly polarized signal to produce a first signal (an electrical signal produced by the LHCP element 418-1 in response to the LHCP component of the linearly polarized signal) on a LHCP channel 420 and the RHCP element 418-2 will respond to a RHCP component of the linearly polarized signal to produce a second signal on RHCP channel 430. Antenna interface 404 reconstructs the transmitted signal by combining the LHCP component and the RHCP component in a combiner 415.

Before combiner 415 combines the first signal on LHCP channel 420 with the second signal on RHCP channel 430, the antenna interface 404 mixes the first and second signals down to an intermediate frequency. In one example implementation, LHCP channel 420 is coupled to a LHCP tuner 421 and RHCP channel 430 is coupled to a RHCP tuner 431. Both LHCP tuner 421 and RHCP tuner 431 mix the first signal and the second signal down to a first intermediate frequency (IF) to form first IF signal 422 and second IF signal 432. Also, in certain implementations, LHCP tuner 421 and RHCP tuner 431 provide a first Automatic Gain Control (AGC) signal 426 and a second AGC signal 436 as outputs. Combiner 415 then receives first IF signal 422, second IF signal 432, first AGC signal 426, and second AGC signal 436.

Combiner 415 receives first IF signal 422 and second IF signal 432 and mixes them to a combining frequency using a LHCP mixer 423 and a RHCP mixer 433. To mix first IF signal 422 and second IF signal 432 to the combining frequency, combiner 415 includes oscillators 424 and 434, which provide reference frequencies for LHCP mixer 423 and RHCP mixer 433. LHCP mixer 423 produces a first combining signal 425 and RHCP mixer 433 produces a second combining signal 435.

In the exemplary embodiment shown in FIG. 4, combiner 415 includes a phase detector 427. Phase detector 427 receives first combining signal 425 and second combining signal 435 as inputs and finds the phase difference between the inputs and provides the difference as an output that is used by one of LHCP mixer 423 and RHCP mixer 433 to match the phase of first combining signal 425 to the phase of second combining signal 435. To match the phases, the output of phase detector 427 is provided as an input to oscillator 424. When oscillator 424 receives the output from phase detector 427, oscillator 424 adjusts the mixing frequency of LHCP mixer 423 such that LHCP mixer 423 changes the phase of first combining signal 425 to match the phase of second combining signal 435. Alternatively, the output of phase detector 427 is provided as an input to oscillator 434. When oscillator 434 receives the output from phase detector 427, oscillator 424 adjusts the mixing frequency of RHCP mixer 433 such that RHCP mixer 433 sets the phase of second combining signal 435 to match the phase of first combining signal 425. In a further embodiment of combiner 415, the first combining signal 425 and the second combining signal 435 are coupled to a combining circuitry 417.

Combining circuitry 417 combines second LHCP IF 425 and second LHCP IF 435 into a single output representing the linearly polarized signal that was broadcast originally from the aircraft 305. Further, combining circuitry 417 receives first AGC signal 426 from first tuner 421 and second AGC signal 436 from second tuner 431. Combining circuitry 417 uses first AGC signal 426 and second AGC signal 436 when determining how to combine second LHCP IF 425 and second RHCP IF 435 into a single output. In one exemplary embodiment, combining circuitry 417 compares the amplitudes of first AGC signal 426 and second AGC signal 436 against one another. If either second AGC signal 436 or first AGC signal 426 has an amplitude that is significantly larger than the other, combining circuitry 417 determines that the combining signal that corresponds with the larger of the AGC signals contains data associated with the aircraft position report. Combiner 415 provides the combining signal associated with the greater of the AGC signals as an output for antenna interface 404. When the first AGC signal 426 and the second AGC signal 436 both have amplitudes that are large enough to contain data representing an aircraft position report, combiner 415 combines the first combining signal 425 with the second combining signal 435 and provides the combined signal as an output for the antenna interface 404. Antenna interface 404 outputs the combined signal to a demodulator 428.

When antenna interface 404 outputs the combined signal to demodulator 428, demodulator 428 converts the received output from antenna interface 404 to a baseband signal containing information representing the aircraft position report. Demodulator 428 passes the baseband signal to aircraft position reporting receiver 438. Aircraft position reporting receiver 438 transmits the signal to other aircraft, to a ground station, or to a relay satellite.

Figure 5:
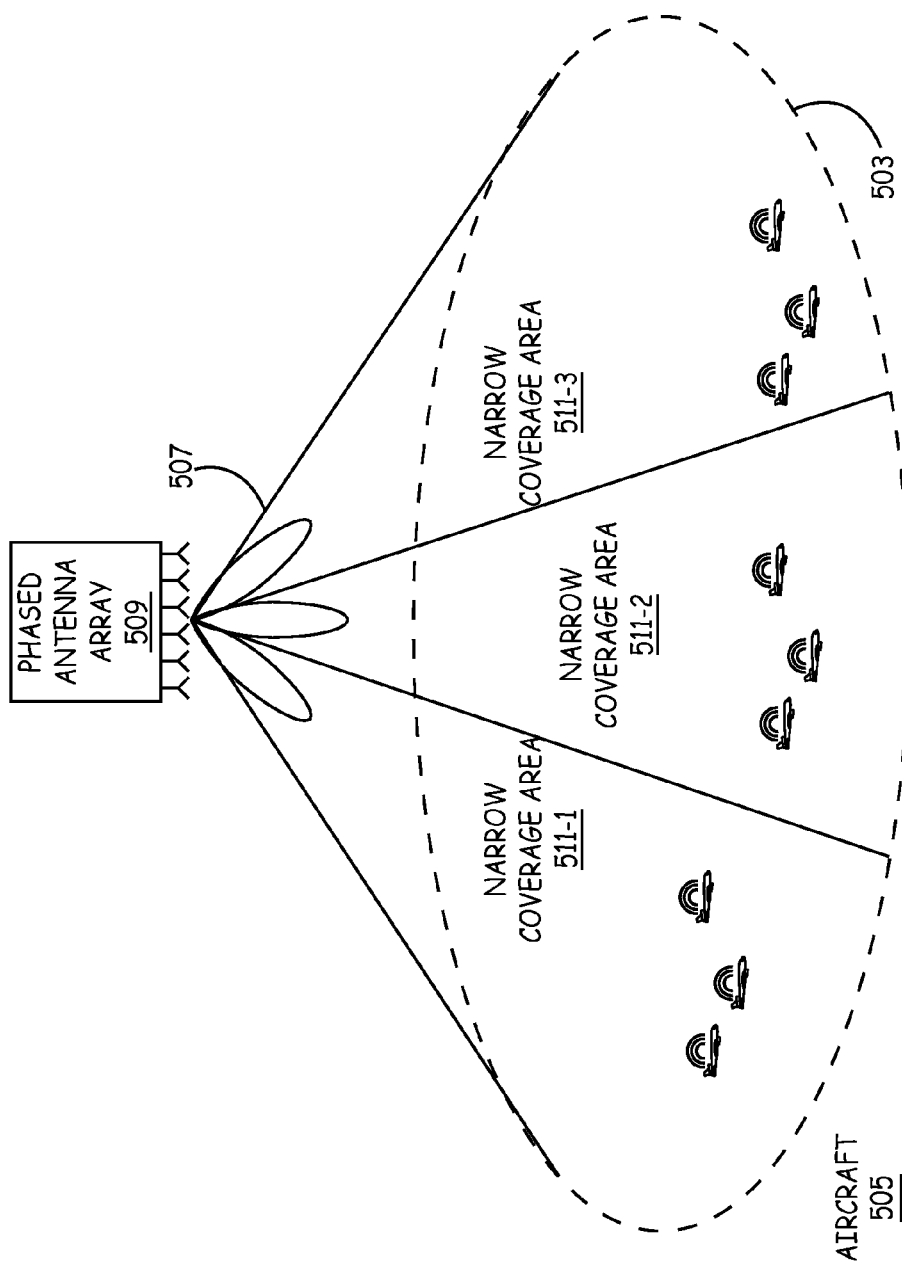
FIG. 5 is a diagram illustrating a second exemplary embodiment of the satellite system shown in FIG. 1.

In contrast to the mechanically steered spot beam described in relation to FIGS. 3 and 4, FIG. 5 is a diagram illustrating the electronic steering of a spot beam through multiple narrow coverage areas. When a spot beam is electronically steered, associating the spot beam (or multiple spot beams) with a narrow coverage area includes electronically forming the spot beam (or multiple spot beams) and electronically steering the beam to receive signals from different narrow coverage areas 511. To electronically steer the spot beam, antenna interface 104 in FIG. 1 receives electrical signals from a phased antenna array 509. Phased antenna array 509 receives signals at all times from throughout the wide coverage region 503. However, the phased antenna array 509 does not have sufficient gain to reliably receive aircraft position report transmissions from aircraft throughout the wide coverage region 503. To receive the aircraft position report transmissions, antenna interface 104 applies complex weights to the signals received from the phased antenna array 509 to electrically form spot beams 507 and associate the spot beams 507 with a narrow coverage area 511 for a dwell time period. For example, where the aircraft position reporting receiver 106 must receive at least one aircraft position report from aircraft 505 in the wide coverage region 503 within a reporting period, the antenna interface 104 applies a first set of complex weights to the signals received from phased antenna array 509 for a first dwell time period, where the first set of complex weights associates spot beam 507 with a first coverage area 511-1. When the first dwell time period expires, antenna interface 104 applies a second set of complex weights to the signals received from phased antenna array 509 for a second dwell time period. The second set of complex weights associates spot beams 507 with a second coverage area 511-2. The antenna interface 104 then proceeds to apply further different sets of complex weights to the signals produced by phased antenna array 509 to associate spot beams 507 with each narrow coverage areas 511 in the coverage area 503 during the reporting period.

In an alternative exemplary embodiment, instead of applying complex weights to the signals received from phased antenna array 509, antenna interface 104 in FIG. 1 includes a set of phase shifters for each beam in spot beams 507. Antenna interface 104 uses the phase shifters to shift the phase of the signals received from phased antenna array 509 to associate a beam with a narrow coverage area 511. After antenna interface 104 shifts the phase of the signals received from phased antenna array 509, the outputs from the phase shifters in a set of phase shifters are summed together and demodulated. The demodulated outputs from multiple sets of phase shifters are then passed to aircraft position reporting receivers 106. The phase shifting of received signals is described in greater detail below with respect to FIG. 8.

In certain embodiments, the satellite system 100 in FIG. 1 includes multiple aircraft position reporting receivers 106 for receiving multiple aircraft position report transmissions simultaneously. When spot beams 507 are electrically steered, the antenna interface 104 applies complex weights to form a separate spot beam 507 for each aircraft position reporting receiver 106. In one implementation, spot beam 507 formed by the application of the complex weights can be simultaneously associated with different narrow coverage areas 511 within the wide coverage region 503. Alternatively, spot beams 507 formed by the application of complex weights can be directed to a single narrow coverage area 511.

Figure 6:
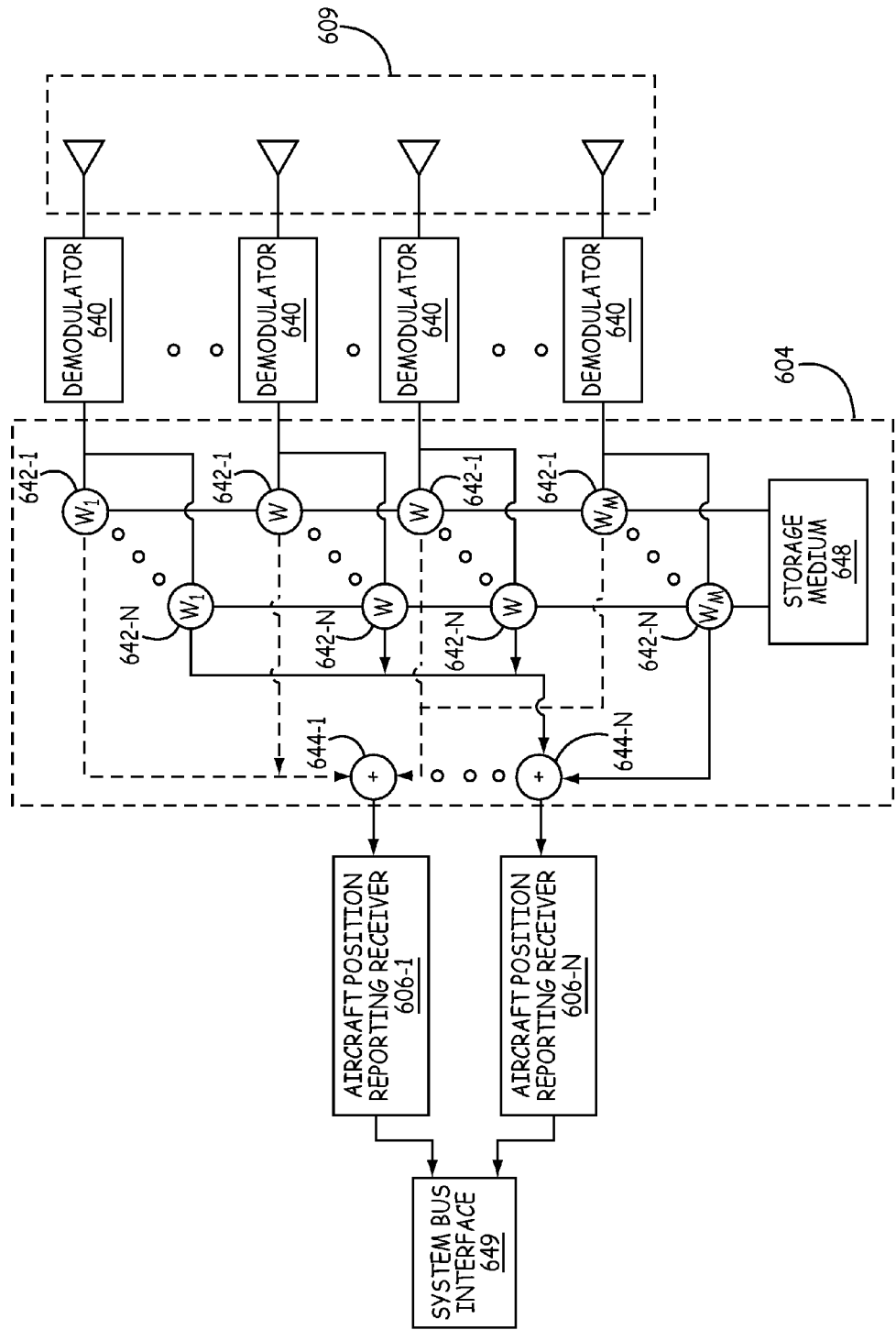
FIG. 6 is a schematic diagram of a second exemplary embodiment of an antenna interface circuit suitable for use in the embodiment of a satellite system shown in FIG. 5.

FIG. 6 is a schematic diagram of an antenna interface 604 for receiving signals produced by phased antenna array 609 as described in FIG. 5. Phased antenna array 609 includes multiple antenna elements that are set a specific fraction of a wavelength apart from each other and produce a signal in response to aircraft position report transmissions. In one exemplary embodiment, in accordance with ADS-B, aircraft position reports are transmitted at a frequency of 1090 MHz. To receive the aircraft position report transmissions, the antenna elements are designed to produce a signal in response to signals with frequencies of 1090 MHz. The antenna elements of phased antenna array 609 can include micro-strip dipole antennas, yagi-uda antennas, conical antennas, among other antenna types. Also, similarly to the elements of the mechanically steered antenna described above in connection with FIGS. 3 and 4, the elements of phased antenna array 609 are able to receive different signal polarizations. For example, phased array antenna 609 is able to respond to RHCP, LHCP, and linearly polarized signals.

In certain implementations, when phased array antenna 609 responds to radio frequency energy, each antenna element in phased array antenna 609 produces an electrical signal which is received by a demodulator 640. Demodulator 640 downconverts the signals produced by the antenna elements of phased antenna array 609 to an IF signal and then converts the IF signal to a baseband signal. Further, demodulator 640 converts the analog signals produced by phased antenna array 609 into digital signals. When converting the analog signals to digital signals, demodulator 640 converts either analog intermediate frequency signals to digital intermediate frequency signals or converts analog baseband signals to digital baseband signals. When demodulator 640 has converted the signals to baseband and digitized the signals, demodulator 640 transmits the signals to antenna interface 604 to create the spot beams from the received signals.

Antenna interface 604 includes complex weight set multipliers 642-1-642-N that electrically form N beams by applying complex weight sets to the digitized baseband signals received from demodulators 640. The phrase "complex weight set," as used herein, refers to a set of complex weights $W_1$-$W_M$, where each complex weight in the complex weight set is applied to an individual baseband signal received from a separate demodulator 640, where the individual baseband signal is associated with a separate antenna element. The application of a complex weight in a complex weight set to a received baseband signal changes the phase of the signal. By adjusting the phase of the multiple signals received through phased array antenna 609, the application of a complex weight set electronically changes the interference pattern between the antenna elements to form a spot beam. By applying multiple complex weight sets to the signals received through phased array antenna 609, complex weight set multipliers 642-1-642-N associate the multiple spot beams with different narrow coverage areas 511 by forming and steering the multiple spot beams to different narrow coverage areas 511 within wide coverage region 503.

In some embodiments, antenna interface 604 includes a storage medium 648 for storing complex weight sets that are used by complex weight set multipliers 642-1-642-N for multiplying the baseband signals received from demodulator 640. In some implementations, storage medium 648 provides a different complex weight set to complex weight set multipliers 642-1-642-N after each dwell time period, where each complex weight set electrically steers the beam to a different narrow coverage area 511. In this particular exemplary embodiment, where a dwell time period is 4 seconds, the complex weight set multipliers 642-1-642-N will receive a first complex weight set from storage medium 648 that steers a spot beam to first narrow coverage area 511-1. When the dwell time period of 4 seconds expires, the complex weight set multipliers 642-1-642-N receive a second complex weight set from storage medium 648 that associates the spot beam with a second narrow coverage area 511-2. The complex weight set multipliers 642-1-642-N continue to receive different complex weight sets every 4 seconds until the spot beam has been steered to each narrow coverage areas 511 in wide coverage region 503. When the spot beam has been steered to each narrow coverage areas 511 in wide coverage region 503, the complex weight set multipliers 642-1-642-N recommence receiving the first complex weight set from storage medium 648 and repeatedly progress through the narrow coverage areas 511 in a wide coverage region 503 during successive reporting periods.

In an alternative embodiment, a ground station periodically updates the complex weight sets on storage medium 648 and also stores time intervals associated with each complex weight set. For example, at certain times of the day some narrow coverage areas 511 may have more aircraft 505 within them than other narrow coverage areas 511. Thus, a ground station updates the storage medium 648 by periodically providing complex weight sets according to the expected distribution of aircraft 505 within a wide coverage region 503 at certain times of a day. In some implementations, when storage medium 648 stores complex weight sets and time intervals associated with the complex weight sets, storage medium 648 provides complex weight sets to complex weight set multipliers 642-1-642-N for a first time interval. At the expiration of the first time interval, storage medium 648 provides a second complex weight set to complex weight set multipliers 642-1-642-N for a second time interval. However, the second time interval may be different from the first time interval. The storage medium 648 continues providing different complex weight sets to complex weight set multipliers 642-1-642-N according to the complex weight sets and time intervals that are stored on storage medium 648.

Antenna interface 604 also includes spot beam summers 644-1-644-N. Each spot beam summer in spot beam summers 644-1-644-N sums the multiple outputs from a complex weight set multiplier 642 in complex weight set multipliers 642-1-642-N to produce an output that includes data received from a narrow coverage area 511 associated with an individual spot beam. For example, complex weight set multiplier 642-1 includes M complex weights. Complex weight set multiplier 642-1 multiplies the M inputs from demodulators 640 by the M complex weights. When complex weight set multiplier 642-1 multiplies the M inputs from demodulators 640, complex weight set multiplier 642-1 provides M outputs that connect to spot beam summer 644-1. Spot beam summer 644-1 then sums the M outputs together and provides them as a single output to an aircraft position reporting receiver 606-1. Each output from spot beam summers 644-1-644-N represents data received from a narrow coverage area 511 associated with a different spot beam. Each output is provided as an output from antenna interface 604 to a different aircraft position reporting receivers 606-1-606-N. The aircraft position reporting receivers 606-1-606-N then communicate the aircraft position reports through a system bus interface 649 for transmission to either a ground terminal, other aircraft, or a relay satellite.

In some implementations, antenna interface 604 is implemented in a field programmable gate array (FPGA). Alternatively, antenna interface 604 is implemented using a digital signal processor (DSP), hardwires, and the like. In some implementations, when antenna interface 604 is implemented in a FPGA, the FPGA will be operating in the radiated environment of space. Due to the radiation present in space, the FPGA containing antenna interface 604 is radiation hardened. In some implementations, when the FPGA is radiation hardened, a complex weight multiplier in a complex weight set multiplier (such as $W_1$ in 642-1) may be implemented redundantly. By redundantly implementing the complex weight set multipliers, the multipliers become resistant to damage from radiation.

Figure 7:
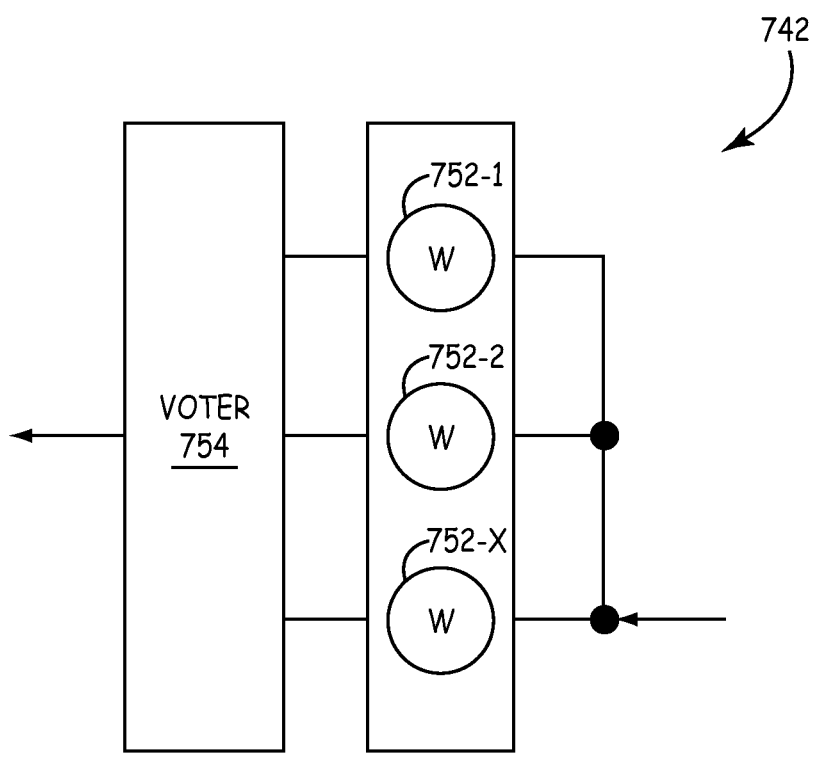
FIG. 7 is a block diagram of one embodiment of a complex weight multiplier suitable for use in the embodiment of an antenna interface shown in FIG. 6.

FIG. 7 is a block diagram of one embodiment of a complex weight multiplier 742 suitable for use in the antenna interface shown in FIG. 6. As shown, complex weight multiplier 742 is implemented redundantly and is suitable for use in a radiation hardened FPGA. When antenna interface 604 is implemented using a radiation hardened FPGA, each complex weight multiplier 742 replaces the complex weight multipliers in complex weight set multipliers 642-1-642-N in FIG. 6. Complex weight multiplier 742 includes multiple redundant multipliers 752-1-752-X. The multiple redundant multipliers 752-1-752-X increase the radiation resistance of complex weight multiplier 700. For example, if a radiation event were to affect individual multiplier 752-1, the remaining redundant multipliers 752-2-752-X would still be able to multiply a received signal by a complex weight.

Further, complex weight multiplier 742 contains a voter 754 which determines whether the data received from the multiple redundant multipliers 752-1-752-X can produce a valid output. Voter 754 determines the output from complex weight multiplier 742 by comparing the outputs from redundant multipliers 752-1-752-X against each other. In some implementations, voter 754 receives a separate input from each of the redundant multipliers 752-1-752-X and identifies an input that is substantially the same from a majority of redundant multipliers 752-1-752-X. For example, when there are three redundant multipliers 752-1-752-3, voter 754 identifies a majority input by checking to see if any two of the three inputs (or all three inputs) are substantially equal. If voter 754 identifies a majority input, then voter 754 outputs the majority input as an output for the complex weight multiplier. If voter 754 is unable to identify a majority input because the multiple redundant multipliers 752-1-752-X provide unequal outputs, then the voter 754 does not provide an output. The redundant multipliers 752-1-752-X in conjunction with voter 754 allow the complex weight multiplier 742 to withstand damage due to radiation from external environments.

Figure 8:
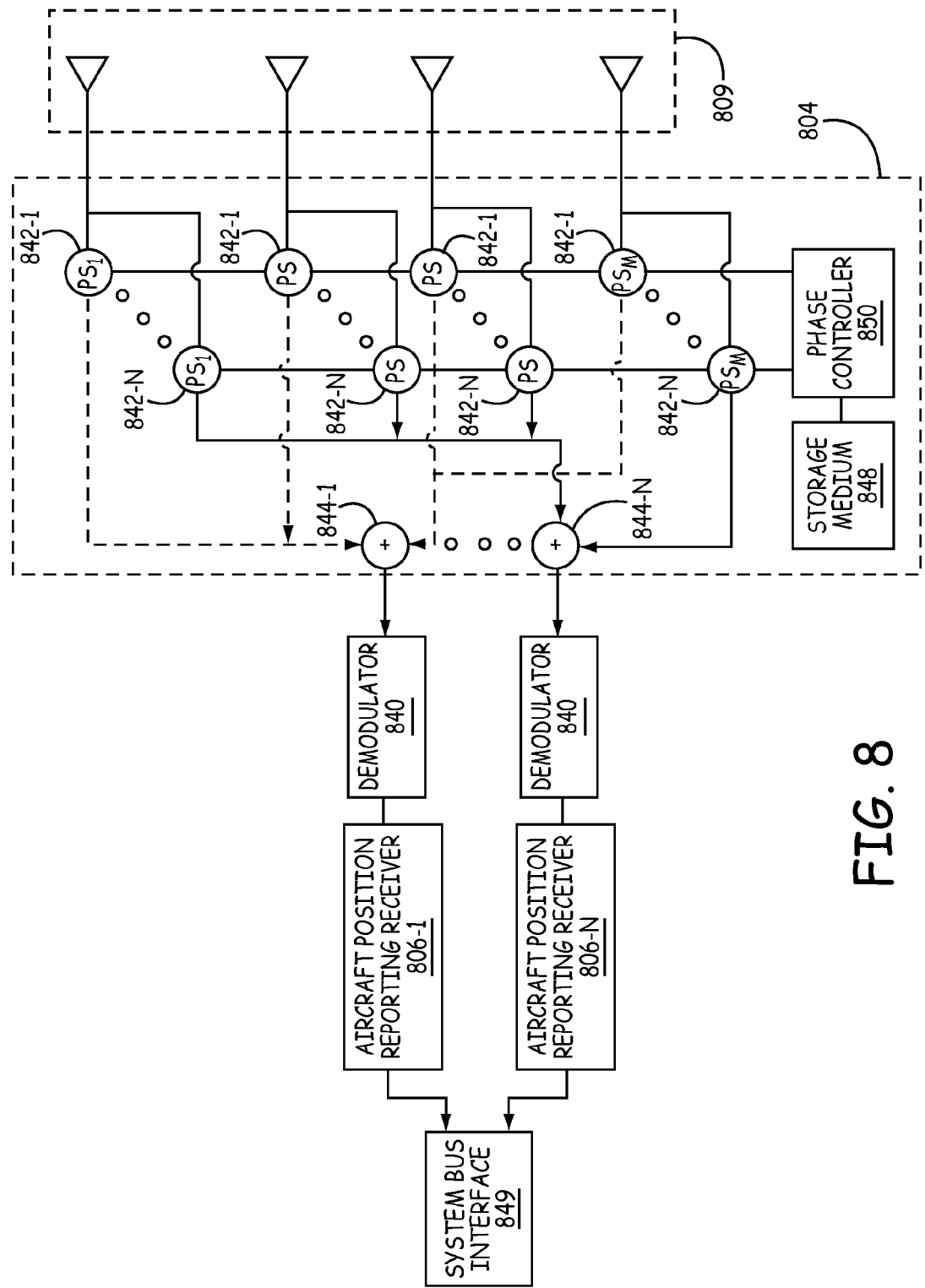
FIG. 8 is a schematic diagram of a third exemplary embodiment of an antenna interface circuit suitable for use in the embodiment of a satellite system shown in FIG. 5.

FIG. 8 is a schematic diagram of an antenna interface 804 for receiving signals produced by phased antenna array 809 as described in FIG. 5. Phased antenna array 809 functions in a similar manner as phased antenna array 609 in FIG. 6. In certain implementations, when phased array antenna 809 responds to radio frequency energy, each antenna element in phased array antenna 809 produces an electrical signal which is received by an antenna interface 804 that includes phase shifter sets 842-1-842-N that electrically form N beams by shifting the phase of the individual signals received from the phased antenna array 809. The phrase "phase shifter set," as used herein, refers to a set of phase shifters $PS_1$-$PS_M$, where each phase shifter in the phase shifter set is applied to an individual signal received from an individual element in phased array antenna 809. By adjusting the phase of the multiple signals received through phased array antenna 809, the phase shifter set electronically changes the interference pattern between the antenna elements to form a spot beam. By shifting the phase of the signals received from phased array antenna 809 with multiple phase shifter sets, phase shifter sets 842-1-842-N associate the multiple spot beams with different narrow coverage areas 511 by forming and steering the multiple spot beams to different narrow coverage areas 511 within wide coverage region 503.

In some embodiments, antenna interface 804 includes a storage medium 848 for storing phase sets that are used by phase shifter sets 842-1-842-N for shifting the phase of the signals received from phased array antenna 809. Further, in some implementations, antenna interface 804 includes a phase controller 850 for determining when to provide different phase sets stored in storage medium 848 to phase shifter sets 842-1-842-N. Phase controller 850 provides phase sets stored in storage medium 848 to phase shifter sets 842-1-842-N after each dwell time period, where each phase shifter set electrically forms and steers the beam to a different narrow coverage area 511. In this particular exemplary embodiment, where a dwell time period is 4 seconds, a phase shifter set 842 in phase shifter sets 842-1-842-N will receive a first phase set from phase controller 850 that associates a spot beam with a first narrow coverage area 511-1. When the dwell time period of 4 seconds expires, the phase shifter set 842 in phase shifter sets 842-1-842-N receives a second complex weight set from phase controller 850 that associates the spot beam with a second narrow coverage area 511-2. Phase shifter sets 842-1-842-N receive different phase sets every 4 seconds until the spot beams formed by the different phase shifter sets 842-1-842-N has been associated with the different narrow coverage areas 511 in wide coverage region 503. When the spot beams have been associated with the different narrow coverage areas 511 in wide coverage region 503, the phase shifter sets 842-1-842-N recommence receiving the phase sets stored in storage medium 848 and repeatedly progress through the narrow coverage areas 511 in a wide coverage region 503 during successive reporting periods.

In an alternative embodiment, a ground station periodically updates the phase sets on storage medium 848 and also stores time intervals associated with each phase set. For example, at certain times of the day some narrow coverage areas 511 may have more aircraft 505 within them than other narrow coverage areas 511. Thus, a ground station updates the storage medium 848 by periodically providing phase sets according to the expected distribution of aircraft 505 within a wide coverage region 503 at certain times of a day. In some implementations, when storage medium 848 stores phase sets and time intervals associated with the complex weight sets, phase controller 850 provides the phase sets to phase shifter sets 842-1-842-N for a first time interval. At the expiration of the first time interval, phase controller 850 provides a second phase set to phase shifter sets 842-1-842-N for a second time interval. However, the second time interval may be different from the first time interval. The phase controller 850 continues providing different phase sets to phase shifter sets 842-1-842-N according to the phase sets and time intervals that are stored on storage medium 848.

Antenna interface 804 also includes spot beam summers 844-1-844-N. Each spot beam summer 844 in spot beam summers 844-1-844-N sums the multiple outputs from a phase shifter set 842 in phase shifter sets 842-1-842-N to produce an output that includes data received from a narrow coverage area 511 associated with an individual spot beam. For example, phase shifter set 842-1 includes M phase shifters. Phase shifter set 842-1 shifts the M signals received from the M antenna elements in phased array antenna 809. When phase shifter set 842-1 multiplies the M inputs from phased array antenna 809, phase shifter set 842-1 provides M outputs that connect to spot beam summer 844-1. Spot beam summer 844-1 then sums the M outputs together and provides them as a single output to a demodulator 840. Demodulator 840 then downconverts the summed signal to baseband and transmits it to an aircraft position reporting receiver 806-1. Each output from spot beam summers 844-1-844-N represents data received from a narrow coverage area 511 associated with a different spot beam. The output from demodulators 840 is passed to different aircraft position reporting receivers 806-1-806-N. The aircraft position reporting receivers 806-1-806-N then communicate the aircraft position reports through a system bus interface 849 for transmission to either a ground terminal, other aircraft, or a relay satellite.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An aircraft position report system comprising:
   a satellite;
   an aircraft position reporting receiver mounted on the satellite;
   at least one antenna element mounted on the satellite; and
   an antenna interface mounted on the satellite, wherein the aircraft position reporting receiver receives aircraft position reports through the at least one antenna element by associating at least one spot beam with a narrow coverage area, the aircraft position reports derived from a signal produced by the at least one antenna element, wherein the antenna interface changes the narrow coverage area associated with the spot beam to receive aircraft position reports from a wide coverage region within a reporting period.

2. The system of claim 1, wherein the aircraft position reporting receiver comprises an automatic dependent surveillance-broadcast (ADS-B) receiver.

3. The system of claim 1, wherein the satellite comprises a low earth orbit satellite.

4. The system of claim 1, wherein the antenna interface is configured to direct the at least one spot beam to cyclically associate with a plurality of narrow coverage areas in the wide coverage region within the reporting period.

5. The system of claim 1, wherein the antenna interface associates the at least one spot beam with a first narrow coverage area for a first dwell time period and associates the at least one spot beam with a second narrow coverage area for a second dwell time period, the sum of the first dwell time period and the second dwell time period is within the reporting period.

6. The system of claim 5, wherein the first dwell time period is equal to the second dwell time period.

7. The system of claim 1, wherein the antenna interface associates the at least one spot beam with a narrow coverage area based on an expected position of an aircraft within the wide coverage region.

8. The system of claim 1, wherein the antenna interface cyclically associates the at least one spot beam with a set of narrow coverage areas during successive reporting periods.

9. The system of claim 1, wherein the antenna interface controls the narrow coverage area associated with the at least one antenna element by mechanically steering the antenna element.

10. The system of claim 9, wherein the antenna interface mechanically steers the at least one antenna element using a gimbal.

11. The system of claim 10, wherein the gimbal mechanically steers an antenna with two elements.

12. The system of claim 11, wherein a first element in the two elements produces a first electrical signal in response to right hand circularly polarized RF signals and a second element in the two elements produces a second electrical signal in response to left hand circularly polarized RF signals.

13. The system of claim 12, wherein the antenna interface comprises:
    a first tuner and a second tuner to mix the first electric signal and the second electric signal to an intermediate frequency; and
    a combiner to combine the first electric signal with the second electric signal.

14. The system of claim 13, wherein the combiner matches the phase of the first electrical signal to the phase of the second electrical signal.

15. The system of claim 13, wherein the combiner compares an amplitude of the first electrical signal to an amplitude of the second electrical signal.

16. The system of claim 13, wherein the combiner selects a signal with greatest signal strength of the first electrical signal and the second electrical signal when the signal strength of the first electrical signal and the signal strength of the second electrical signal are substantially different.

17. The system of claim 1, wherein the at least one antenna element is part of a phased array of antenna elements.

18. The system of claim 17, wherein the phased array of antenna elements produces three or more spot beams, wherein the antenna interface simultaneously changes the narrow coverage area associated with the three or more spot beams to receive the aircraft position reports from the wide coverage region within the reporting period.

19. The system of claim 17, wherein the system further comprises:
    a phase shifter set that comprises a plurality of phase shifters that associate the at least one spot beam with a narrow coverage area, wherein a phase shifter in the plurality of phase shifters shifts the phase of a signal produced by the at least one antenna element;
    a spot beam summer to sum outputs of the plurality of phase shifters; and
    a demodulator to demodulate the output from the spot beam summer to a baseband signal.

20. The system of claim 17, wherein the system further comprises:
    a demodulator associated with the antenna element in the phased array of antenna elements, the demodulator demodulating the signal produced by the at least one antenna element to a baseband signal.

21. The system of claim 20, the antenna interface further comprising:
   a complex weight multiplier that multiplies the baseband signal by a complex weight to adjust the phase of the baseband signal;
   a spot beam summer to sum outputs of a plurality of complex weight multipliers; and
   a storage device to store complex weights.

22. The system of claim 21, wherein the complex weight multiplier is redundantly implemented, the complex weight multiplier comprising:
   a plurality of multipliers that are configured to multiply the baseband signal by the same complex weight and produce a plurality of outputs; and
   a voter coupled to the plurality of multipliers to determine an output that is approximately equal to a majority of outputs in the plurality of outputs.

23. The system of claim 21, wherein the aircraft interface is implemented in a radiation hardened field programmable gate array.

24. The system of claim 21:
   wherein the aircraft interface forms a spot beam by applying a complex weight set to a plurality of baseband signals produced by a plurality of antenna elements; and
   wherein the aircraft interface electrically steers the spot beam by applying a different complex weight set to the plurality of baseband signals, each different complex weight set associated with a different narrow coverage area within the wide coverage region.

25. An antenna system comprising:
   at least one antenna element mounted on a satellite; and
   an antenna interface mounted on the satellite, wherein the antenna interface associates a narrow coverage area with an aircraft position reporting receiver for receiving aircraft position reports through an antenna element by associating at least one spot beam with a narrow coverage area, wherein the antenna interface changes the at least one spot beam to associate with a plurality of narrow coverage areas within a wide coverage region within a reporting period.

26. The antenna system of claim 25, wherein the antenna interface uses a gimbal to mechanically associate the at least one spot beam with the narrow coverage area.

27. The antenna system of claim 25, wherein the at least one antenna element is part of a phased array of antenna elements, and the antenna interface applies complex weights to electrical signals produced by each element in the phased array of antenna elements to electrically associate the at least one spot beam with different narrow coverage areas in the wide coverage region.

28. A method of receiving aircraft position report transmissions from aircraft within a wide coverage region using a satellite, the method comprising:
   associating one of a plurality of narrow coverage areas with an aircraft position reporting receiver in connection with producing an input for the receiver from a signal output from an antenna element mounted on the satellite, wherein a wide coverage region is formed from the plurality of narrow coverage areas;
   receiving, at the receiver using the input, an aircraft position report transmission from an aircraft within the narrow coverage area associated with the receiver; and
   changing which of the plurality of narrow coverage areas is associated with the aircraft position reporting receiver.

29. The method of claim 28, wherein changing which of the plurality of narrow coverage areas is associated with the aircraft position reporting receiver comprises mechanically steering a spot beam.

30. The method of claim 29, wherein mechanically steering the spot beam comprises using a gimbal to change the position of the antenna element.

31. The method of claim 30, further comprising:
   converting the signal output produced by the antenna element into a left hand circularly polarized signal and a right hand circularly polarized signal; and
   combining the left hand circularly polarized signal and the right hand circularly polarized signal into the input.

32. The method of claim 31, wherein combining the left hand circularly polarized signal and the right hand circularly polarized signal comprises:
   matching the phase of the left hand circularly polarized signal to the phase of the right hand circularly polarized signal;
   comparing the amplitude of the left hand circularly polarized signal to the amplitude of the right hand circularly polarized signal;
   combining the left hand circularly polarized signal with the right hand circularly polarized signal based on the comparison of the amplitude.

33. The method of claim 28, wherein changing which of the plurality of narrow coverage areas is associated with the aircraft position reporting receiver comprises electrically steering a spot beam.

34. The method of claim 33, wherein electrically steering the spot beam comprises:
   producing the signal output using a phased antenna array; and
   applying a complex weight set to the signal output to form the spot beam.

35. The method of claim 34, wherein changing the narrow coverage area comprises applying a different complex weight set to the signal output.

* * * * *